(12) United States Patent
Shifferaw et al.

(10) Patent No.: US 6,723,357 B1
(45) Date of Patent: *Apr. 20, 2004

(54) HIGH ENERGY SNACK FOOD PRODUCT AND PROCESS OF MANUFACTURE

(76) Inventors: Tessema Dosho Shifferaw, 3000 Giant Hwy., San Pablo, CA (US) 94804-1017; Yodit G. Wolde, 3000 Giant Hwy., San Pablo, CA (US) 94806

( * ) Notice: Subject to any disclaimer, the term of this patent is extended or adjusted under 35 U.S.C. 154(b) by 0 days.

This patent is subject to a terminal disclaimer.

(21) Appl. No.: 09/699,218

(22) Filed: Oct. 26, 2000

Related U.S. Application Data

(63) Continuation of application No. 08/951,751, filed on Oct. 16, 1997, now Pat. No. 6,139,884.

(51) Int. Cl.⁷ .................................................. A23L 1/36
(52) U.S. Cl. ............................ 426/93; 426/44; 426/94; 426/549; 426/618; 426/169; 426/620; 426/621
(58) Field of Search ........................... 426/93, 94, 549, 426/618, 619, 620, 621, 44

(56) References Cited

U.S. PATENT DOCUMENTS

| 4,496,606 | A | | 1/1985 | Michnowski |
| 4,871,557 | A | | 10/1989 | Linscott |
| 5,275,830 | A | | 1/1994 | Smith |
| 5,360,619 | A | | 11/1994 | Alexander |
| 5,382,443 | A | | 1/1995 | Kincaid et al. |
| 5,612,074 | A | | 3/1997 | Leach |
| 6,139,884 | A | * | 10/2000 | Shifferaw et al. ............. 426/93 |

OTHER PUBLICATIONS

The Wiley Encyclopedia of Packaging Technology, pp. 218–221, 1986.*

* cited by examiner

*Primary Examiner*—Lien Tran
(74) *Attorney, Agent, or Firm*—Edward S. Wright

(57) ABSTRACT

High energy food product which consists primarily of an admixture of barley, flax and teff, and a binder which holds the admixture together. The binder includes corn syrup, honey, canola oil, ground sunflower seeds, and it is added to the admixture after the barley, flax and teff have been mixed together. The process is carried out in a way which prevents light from causing deterioration of either the admixture or the final product.

5 Claims, 1 Drawing Sheet

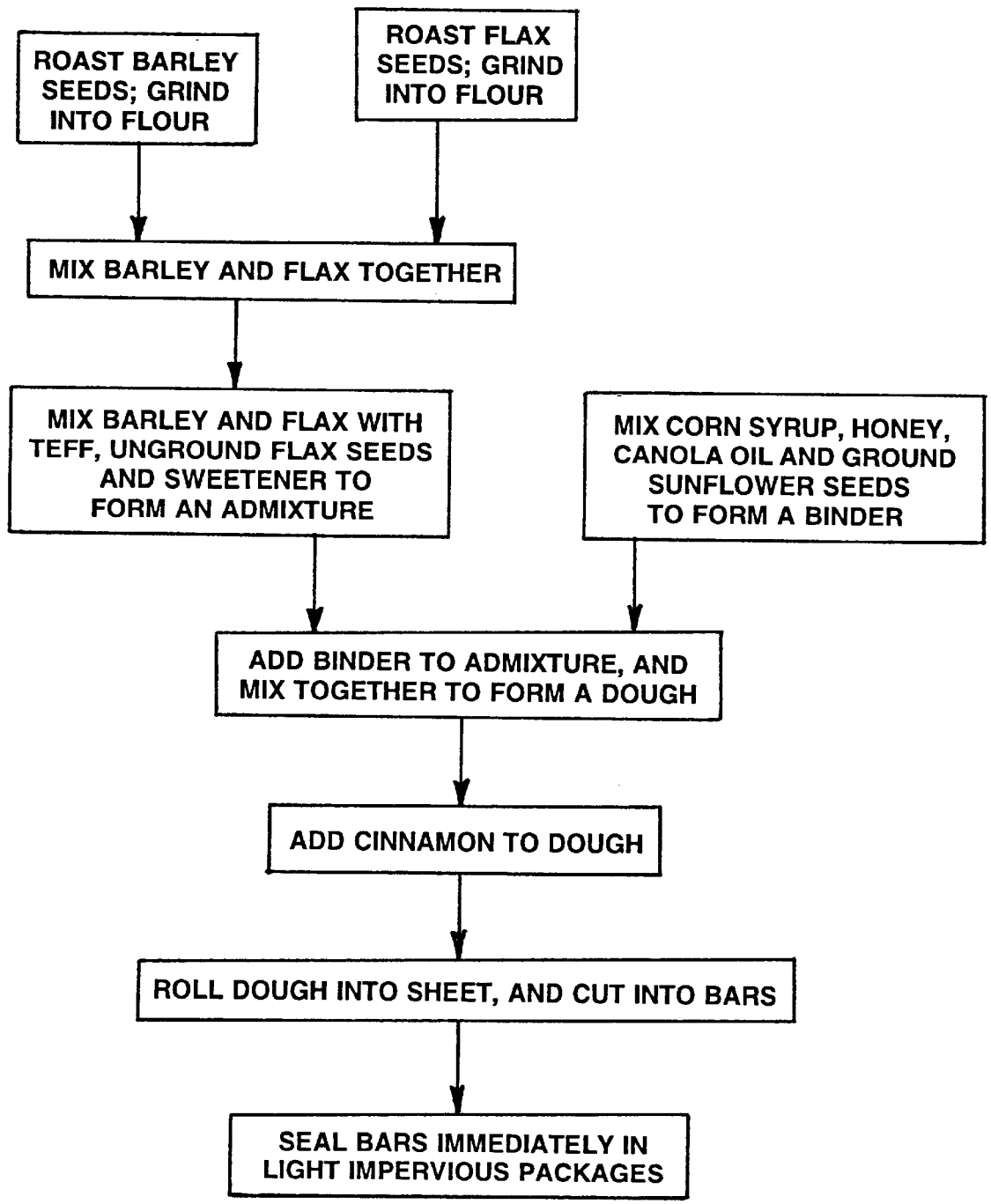

HIGH ENERGY SNACK FOOD PRODUCT AND PROCESS OF MANUFACTURE

This is a continuation of Ser. No. 08/951,751, filed Oct. 16, 1997 now U.S. Pat. No. 6,139,884.

BACKGROUND OF THE INVENTION

This invention pertains generally to food products and, more particularly, to a high energy snack food product and process of manufacturing the same.

In recent years, there has been an increasing interest in heathy snack food products such as granola bars and the like. Such products are generally better for people to eat than other snack foods such as candy bars, and they can provide extra energy as well as nutrients.

OBJECTS AND SUMMARY OF THE INVENTION

It is in general an object of the invention to provide a new and improved high energy snack food product and process of manufacturing the same.

Another object of the invention is to provide a food product and process of the above character utilizing only natural ingredients.

These and other objects are achieved in accordance with the invention by providing a bar which consists primarily of an admixture of barley, flax and teff, and a binder which holds the admixture together. The binder includes corn syrup, honey, canola oil, ground sunflower seeds, and it is added to the admixture after the barley, flax and teff have been mixed together. The process is carried out in a way which prevents light from causing deterioration of either the admixture or the final product.

BRIEF DESCRIPTION OF THE DRAWING

The single FIGURE of drawing is a flow chart of one embodiment of a process for manufacturing a high energy food product in accordance with the invention.

DETAILED DESCRIPTION

In a presently preferred embodiment, a food product manufactured in accordance with the invention contains the following ingredients:

6 parts ground barley
2 parts ground flax
2 parts teff seeds
1 part unground flax seeds
1 part carob
2 parts corn syrup
2 parts honey
1 part canola oil
2 parts ground sunflower seeds
½ part cinnamon The barley is cleaned and lightly roasted at a temperature on the order of 100° C. for about 3 minutes until brown. After roasting, the seeds, which are still in their skins, are ground into a powder form, or flour.

The ground flax is prepared by lightly roasting flax seeds at a temperature on the order of 100° C. for a period of about 2–3 minutes in a flat pan. Immediately after roasting, the flax seeds are cooled for a period of about 5 minutes, then ground into a fine powder, or flour.

The teff seeds are likewise roasted at a temperature on the order of 100° C. for a period of about 2–3 minutes, then kept at a cool temperature.

The barley flour and flax flour are mixed together, then the teff seeds, unground flax seeds and carob are added to the mixture and mixed with it to form an admixture. The admixture is then kept in a cool, dark place so that light will not cause oxidation which could cause the final product to have a bitter taste. The admixture can be stored for up to about 8 months without deterioration as long as it is kept in a cool, dark place.

The carob serves as a sweetener as well as giving a chocolate flavor to the product. However, any natural sweetener can be used, including extracts such as banana extract.

The corn syrup, honey, canola oil and ground sunflower seeds are mixed together to form a binder which is then poured into the admixture and mixed with it to form a dough. The ground sunflower seeds have a consistency like peanut butter, and they serve to keep the dough moist and flexible.

After the dough is thoroughly mixed, the cinnamon is added and mixed into the dough.

The dough is then rolled out into a flat sheet and cut into bars of the desired shape, e.g. square. To prevent oxidation, the bars are immediately sealed in plastic film wrappers or other suitable packages which are impervious to light. If desired, the bars can be vacuum sealed for even better preservation.

The invention has a number of important features and advantages. The bars contain only natural ingredients and are high in both nutrition and energy. They contain no preservatives, food coloring or other artificial additives.

The flax seeds contain several essential nutrients, including calcium, iron, niacin, phosphorous and Vitamin E. It is also a rich source of Omega-3 fatty acid.

The teff seeds are a rich source of calcium, iron, protein and niacin. The are one of the smallest seeds in the world, with about 150 teff seeds being equal in size to one grain of wheat.

The barley contains about 8–10 percent protein, 62–65 percent starch, 1–3 percent fat, and 2–3 percent mineral water.

The bars have been found to work quite well for weight management, fighting fatigue, and rejuvenating body cells. They contain a large amount of fiber which keeps the digestive system clean and regular.

It is apparent from the foregoing that a new and improved high energy snack food product and process of manufacture have been provided. While only certain presently preferred embodiments have been described in detail, as will be apparent to those familiar with the art, certain changes and modifications can be made without departing from the scope of the invention as defined by the following claims.

What is claimed is:

1. A process of manufacturing food bars, comprising the steps of: forming an admixture of barley, flax and teff, adding a binder to the admixture to form a dough, forming the dough into bars, and immediately vacuum sealing the bars in packages, the admixture being formed by grinding lightly roasted flax seeds, and mixing the ground flax seeds with the barley and the teff.

2. A process of manufacturing food bars, comprising the steps of: forming an admixture of barley, flax and teff, adding a binder to the admixture to form a dough, forming the dough into bars, and immediately vacuum sealing the bars in packages, the admixture being formed by mixing together ground barley seeds and ground flax seeds, then adding teff seeds and unground flax seeds.

3. A process of manufacturing food bars, comprising the steps of: forming an admixture of barley, flax and teff, adding a binder to the admixture to form a dough, forming the dough into bars, and immediately vacuum sealing the bars in packages, the barley being prepared by lightly roasting barley seeds and grinding the roasted seeds to make a flour.

4. A process of manufacturing food bars, comprising the steps of: forming an admixture of barley, flax and teff, adding a binder to the admixture to form a dough, forming the dough into bars, and immediately vacuum sealing the bars in packages, the flax being prepared by lightly roasting flax seeds and grinding the roasted seeds to make a flour.

5. A process of manufacturing food bars, comprising the steps of: forming an admixture of barley, flax and teff, adding a binder to the admixture to form a dough, rolling the dough into a sheet, cutting the sheet into bars, and immediately vacuum sealing the bars in packages.

* * * * *